(12) United States Patent
Kapil

(10) Patent No.: US 7,263,586 B1
(45) Date of Patent: Aug. 28, 2007

(54) CACHE COHERENCY FOR MULTIPLE INDEPENDENT CACHE OF A DOMAIN

(75) Inventor: Sanjiv Kapil, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 511 days.

(21) Appl. No.: 10/779,839

(22) Filed: Feb. 17, 2004

(51) Int. Cl.
*G06F 12/00* (2006.01)
(52) U.S. Cl. .................... 711/146; 711/141; 711/144
(58) Field of Classification Search ............... 711/141, 711/144, 146
See application file for complete search history.

(56) References Cited

U.S. PATENT DOCUMENTS

| | | | | |
|---|---|---|---|---|
| 5,715,428 | A | * | 2/1998 | Wang et al. ............... 711/141 |
| 5,751,983 | A | * | 5/1998 | Abramson et al. .......... 712/216 |
| 5,805,837 | A | * | 9/1998 | Hoover et al. .............. 710/110 |
| 6,604,116 | B1 | * | 8/2003 | Gupta ........................ 707/200 |

OTHER PUBLICATIONS

"RM9000x2™ Integrated Multiprocessor", PMC-Sierra, Inc., Burnaby, B.C. Canada, 2001, pp. 1-2.

"L9 Snoop-based Multiprocessor Design", University of Massachusetts, Department of Electrical and Computer Engineering, pp. 1-29, <downloaded from http://www.ecs.umass.edu/ece/andras/courses/ECE669/L9.pdf on Jul. 26, 2005>.

Kapil, S. et al., "Gemini: A First Generation Chip MultiThreaded Processor for Network Facing Workloads", <downloaded from http://www.sun.com/processors/pressreleases on Jul. 26, 2005>.

* cited by examiner

*Primary Examiner*—Kimberly McLean-Mayo
(74) *Attorney, Agent, or Firm*—Darby & Darby P.C.; Thomas R. Marquis

(57) ABSTRACT

Distinguishing between snoops initiated internally with respect to a processing unit and snoops initiated externally with respect to a processing unit allows maintenance of cache coherency for a processing unit with multiple independent cache nits. A processing unit with multiple independent cache units, issues an externally initiated snoop to its cache units. Responses from the multiple independent cache units are the basis for a unified response provided to at least the initiator of the external snoop. An internally initiated snoop is communicated to the host system, and communicated to peer cache unit(s) within the processing unit.

26 Claims, 16 Drawing Sheets

CACHE COHERENCY FOR MULTIPLE INDEPENDENT CACHE OF A DOMAIN

BACKGROUND

1. Field of the Invention

The present invention relates to the field of computers. More specifically, the present invention relates to computer architecture.

2. Description of the Related Art

Conventional multi-processor systems attempt to take advantage of faster access of cache than memory. When a processor generates a cache miss, the cache miss is broadcast to other processors of the system. The other processors monitor the system bus for such communications ("snooping"). If a processor snoops a cache miss on the system bus, then the processor queries its own cache to determine if the desired data resides within its cache. Typically, a snooping mechanism, coextensive with a bus controller, issues a "snoop" to the cache. In order to maintain cache coherency, snoops and snoop responses abide by sequential constraints. Conventional processors maintain a queue for the snoops and the snoop responses. The queues force the snoops and snoop responses to conforms to the sequential constraints for cache coherency.

However, conventional techniques do not account for snoops initiated internally and externally with respect to a processor. Asynchronous snoop arrival from the system and internal cache activity of a processor violates the desired sequential constraints. Replication of the conventional technique which accommodates a single secondary cache within a processor, would employ a port for each second cache. In addition to increasing complexity and occupation of space with additional ports, the number of snoop responses would increase, thus forcing the system bus to handle additional traffic.

SUMMARY OF THE INVENTION

It has been discovered that a processing unit with multiple independent cache units efficiently maintains cache coherency by distinguishing between snoops initiated externally with respect to the processing unit and snoops initiated internally with respect to the processing unit. Although the processing unit includes multiple independent cache units (e.g., multiple L2 cache), the processing unit presents itself to a host system as having a unified cache unit. Presenting the multi-cache processing unit has having a unified cache unit provided an economy of processing unit space and interconnects, such as ports. The multi-cache processing unit can communicate with a single port, despite having multiple independent cache units. In addition to providing space economy, scalability is also provided. For example, additional independent cache units can be added without requiring additional ports. An externally initiated snoop is issued to the cache units of a processing unit. The responses from the cache units are combined into a unified response, which is communicated to the host system.

These and other aspects of the described invention will be better described with reference to the Description of the Preferred Embodiment(s) and accompanying Figures.

BRIEF DESCRIPTION OF THE DRAWINGS

The present invention may be better understood, and its numerous objects, features, and advantages made apparent to those skilled in the art by referencing the accompanying drawings.

FIG. 1 depicts an exemplary domain that includes multiple cores and corresponding cache. FIG. 2 depicts an exemplary system with a processing unit that includes a shared cache. FIG. 3 depicts an exemplary system with a processing unit that includes a single core and multiple cache. FIG. 4 depicts an exemplary system with a processing unit with shared cache among multiple cores.

FIG. 8A illustrates an exemplary cache coherency unit handling multiple internal read misses. FIG. 8B illustrates the exemplary cache coherency unit updating stores and issuing snoops. FIG. 8C illustrates the exemplary cache coherency unit handling snoop responses.

FIG. 9A illustrates an exemplary cache coherency unit detecting an internally initiated data request and an externally initiated data request. FIG. 9B illustrates the exemplary cache coherency unit handling snoops. FIG. 9C illustrates the exemplary cache coherency unit handling a response to the externally initiated snoop. FIG. 9D illustrates the exemplary cache coherency unit merging snoop responses. FIG. 9E illustrates the exemplary cache coherency unit supplying the response to the internally initiated snoop.

The use of the same reference symbols in different drawings indicates similar or identical items.

DESCRIPTION OF THE PREFERRED REALIZATION(S)

The description that follows includes exemplary systems, methods, techniques, instruction sequences and computer program products that embody techniques of the present invention. However, it is understood that the described invention may be practiced without these specific details. For instance, the description refers to a cache coherency protocol, such as MOESI, MSI, MOSI, MESI, etc. In other instances, well-known protocols, structures and techniques have not been shown in detail in order not to obscure the invention.

The term snoop is utilized as is understood within the context of computer architecture. "Snooping" refers to the monitoring of a communications channel for a data request, such as a read miss. A "snoop" refers to information related to a snooped data request. The snoop at least includes a data location (snoop address) and indication of the initiator of the data request (snoop source or snoop initiator). A "snoop response" from a cache unit indicates whether the responding cache unit currently hosts the requested data and the state of the data (e.g., clean, dirty, etc.).

FIGS. 1-4 depict exemplary systems with multiple processing units. Each of the exemplary systems includes at least one processing unit with multiple cache units. These Figures illustrate utilization of domain cache coherency for multiple cache units in different scenarios. A domain in a multiple processing unit system represents itself as a single entity to the host system, although the domain may encompass multiple cores, a single core with multiple cache, a single port, etc.

Figure 1:
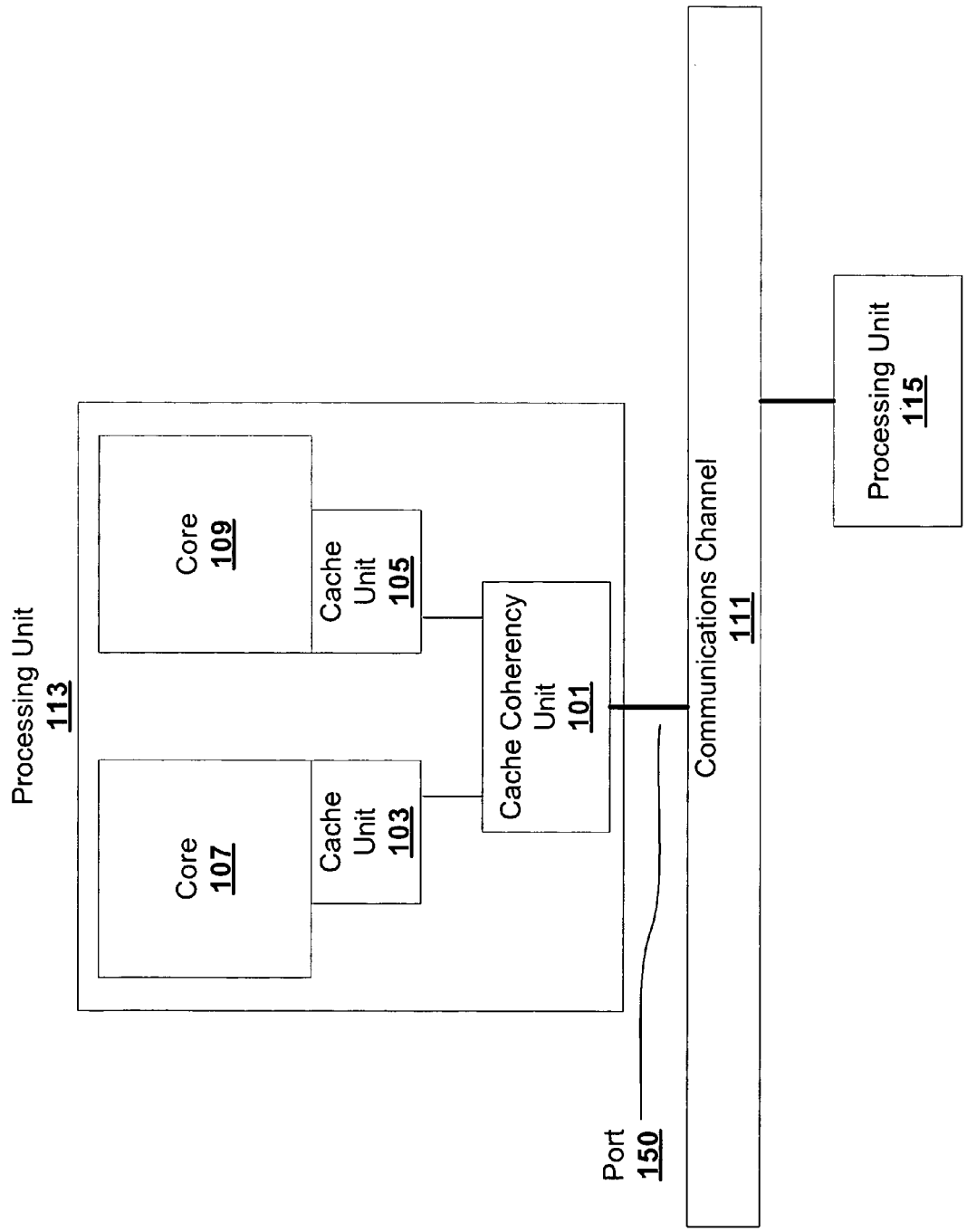
FIGS. 1-4 depict exemplary systems with multiple processing units.

FIG. 1 depicts an exemplary domain that includes multiple cores and corresponding cache. A processing unit 113 includes cores 107 and 109, cache units 103 and 105, and a cache coherency unit 101. The cores 107 and 109 are respectively coupled with the cache units 103 and 105. The cache units 103 and 105 are coupled with the cache coherency unit 101. The cache units 103 and 105 include fast memory (e.g., L2 cache) and circuitry to operate on the fast memory (e.g., searching the fast memory, reads to the fast memory, writes to the fast memory, snoop processing, etc.). The cache coherency unit 101 is coupled to a communications channel 111 (e.g., a scalable network, an interconnect, system bus, etc.) via a port 150 (e.g., a JBus port). The communications channel 111 is also coupled with a processing unit 115, which may have multiple cache units, a single cache unit, etc.

Figure 2:
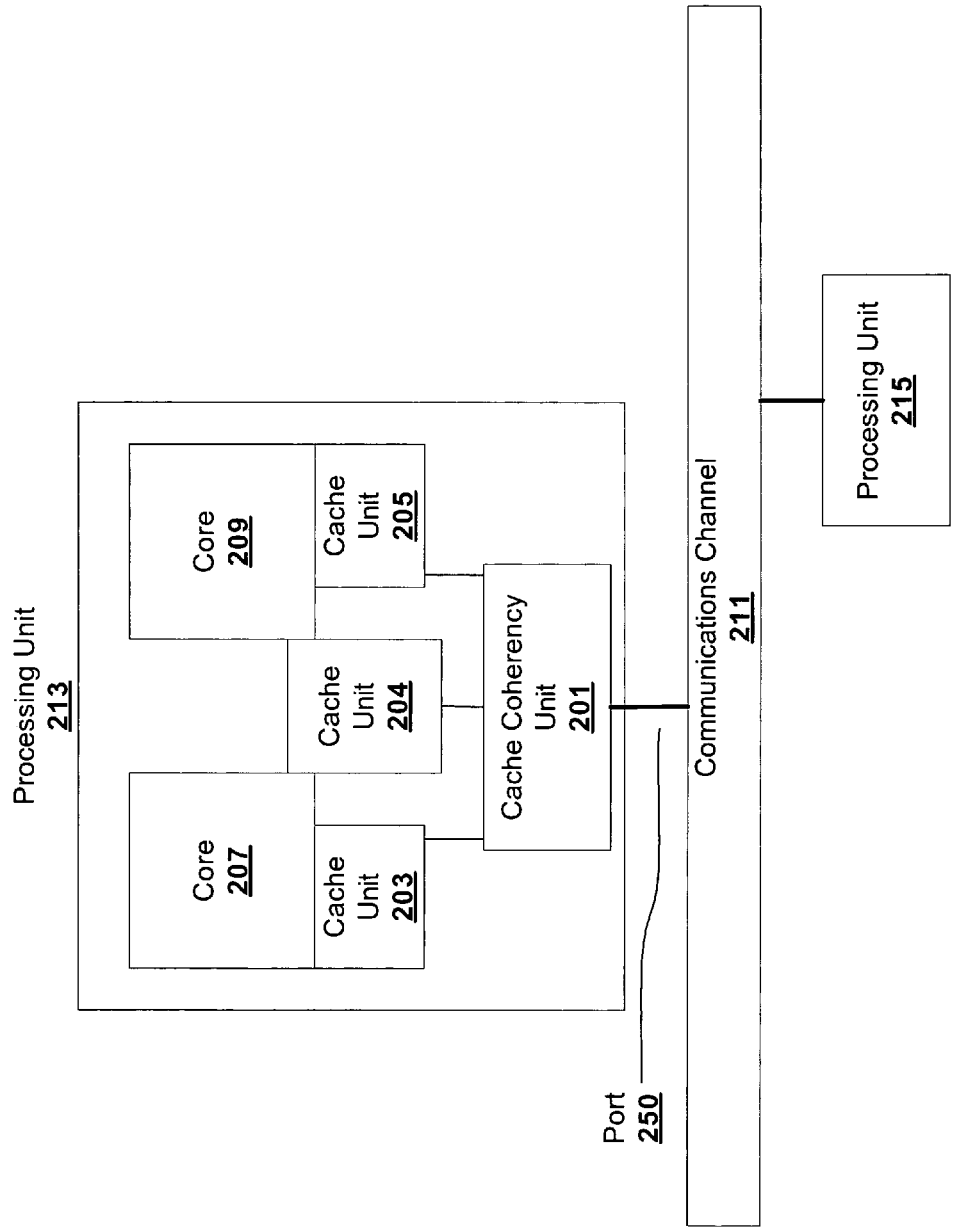
Figure 3:
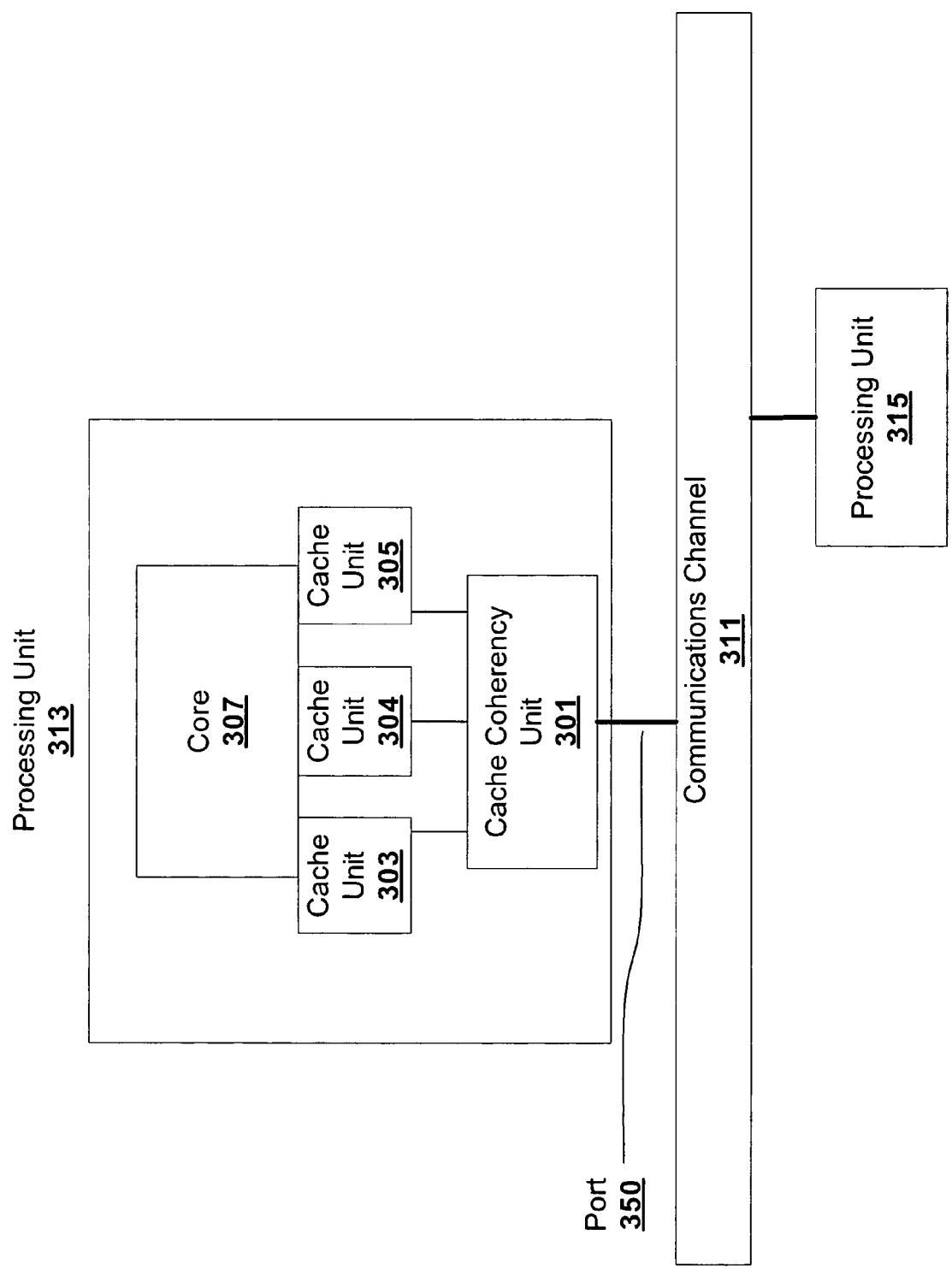
Figure 4:
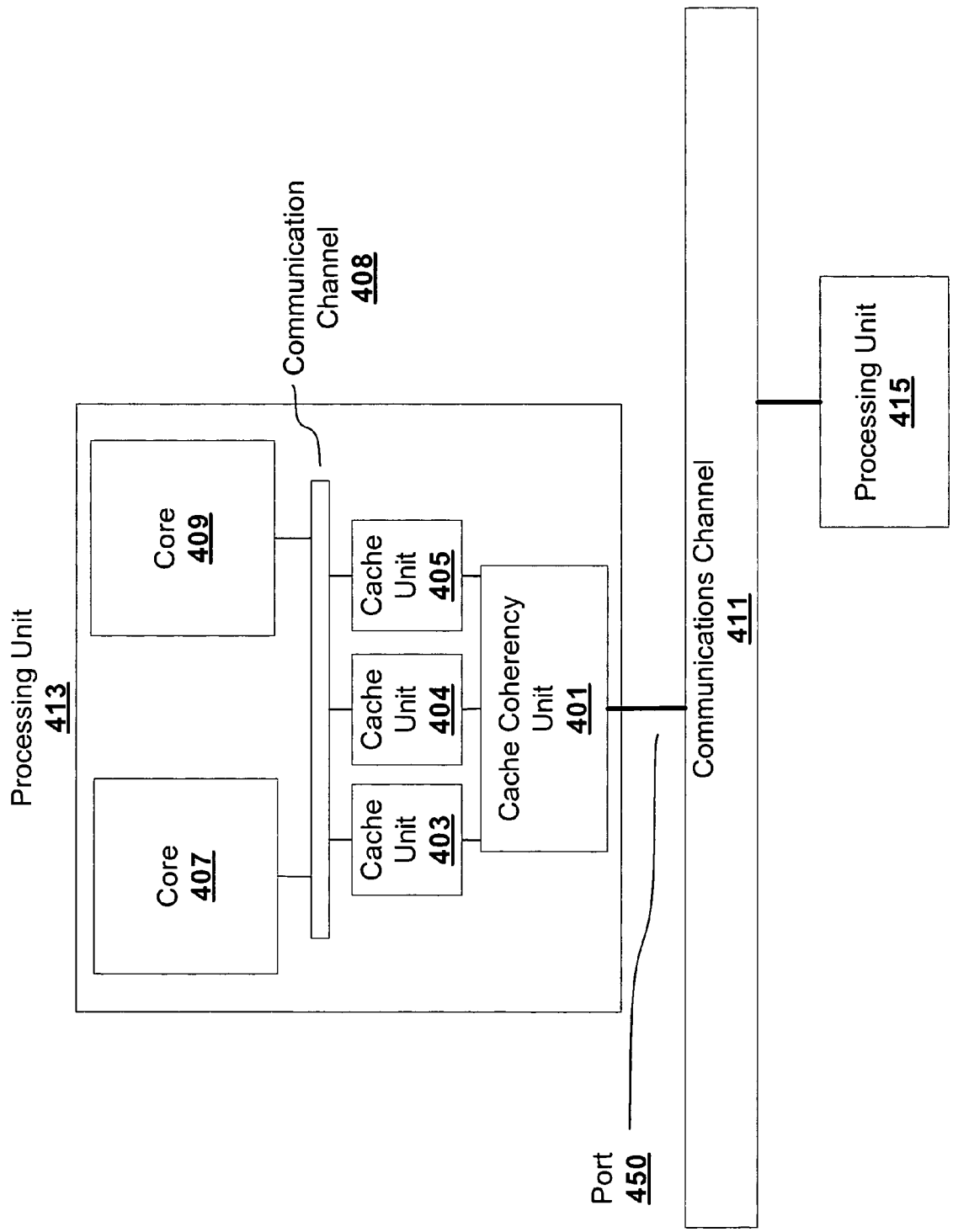

The cache coherency unit 101 monitors the communications channel 111 for cache related communications (e.g., read miss). The cache coherency unit 101 also processes cache related communications from the cache units 103 and 105. The cache coherency unit 101 supplies snoops to the cache units 103 and 105 while maintaining sequential ordering of cache related communications as they appear on the communications channel 111. The cache coherency unit 101 also supplies snoop responses as a unified response for the processing unit 113 to the communications channel 111. For example, if the cache coherency unit detects a read miss from the processing unit 115, then the cache coherency unit will issue snoops to both cache units 103 and 105. The cache units 103 and 105 will respond to the issued snoops, but the cache coherency unit 101 merges the snoop responses and supplies a single response to the processing unit 115 as a snoop response from the processing unit 113. Hence, a single port for the processing unit 113 is sufficient for cache communication in the system instead of a port for each responding cache unit. As previously mentioned, FIGS. 2-4 depict exemplary systems with variations of processing units that have multiple cache and a single port for cache related communications. The cache coherency units of FIGS. 2-4 operate similarly to the cache coherency unit 101 of FIG. 1, with adjustments for the architectural variations.

FIG. 2 depicts an exemplary system with a processing unit that includes a shared cache. A processing unit 213 includes cores 207 and 209, cache units 203, 204, and 205, and a cache coherency unit 201. The core 207 is coupled with the cache units 203 and 204. The core 209 is coupled with the cache units 204 and 205. A communications channel 211 couples the processing unit 213 with a processing unit 215. The processing unit 213 is coupled with the communication channel 211 via a port 250. The cache coherency unit 201 functions similarly to the cache coherency unit of FIG. 1, with accommodations for the additional cache unit 204.

FIG. 3 depicts an exemplary system with a processing unit that includes a single core and multiple cache. A processing unit 313 includes a core 307, cache units 303, 304, and 305, and a cache coherency unit 301. The core 307 is coupled with the cache units 303, 304, and 305. A communications channel 311 couples the processing unit 313 with a processing unit 315. The processing unit 213 is coupled with the communication channel 211 via a port 350. The cache coherency unit 301 functions similarly to the cache coherency units of FIGS. 1 and 2.

FIG. 4 depicts an exemplary system with a processing unit with a network of cache among multiple cores. A processing unit 413 includes cores 407 and 409, an interconnect 408, cache units 403, 404, and 405, and a cache coherency unit 401. The cores 407 and 409 are coupled with the interconnect 408. The cache units 403-405 are also coupled with the interconnect 408. The cache coherency unit 401 is coupled with a communications channel 411 via a port 450. The communications channel 411 couples the processing unit 413 with a processing unit 415.

Figure 5:
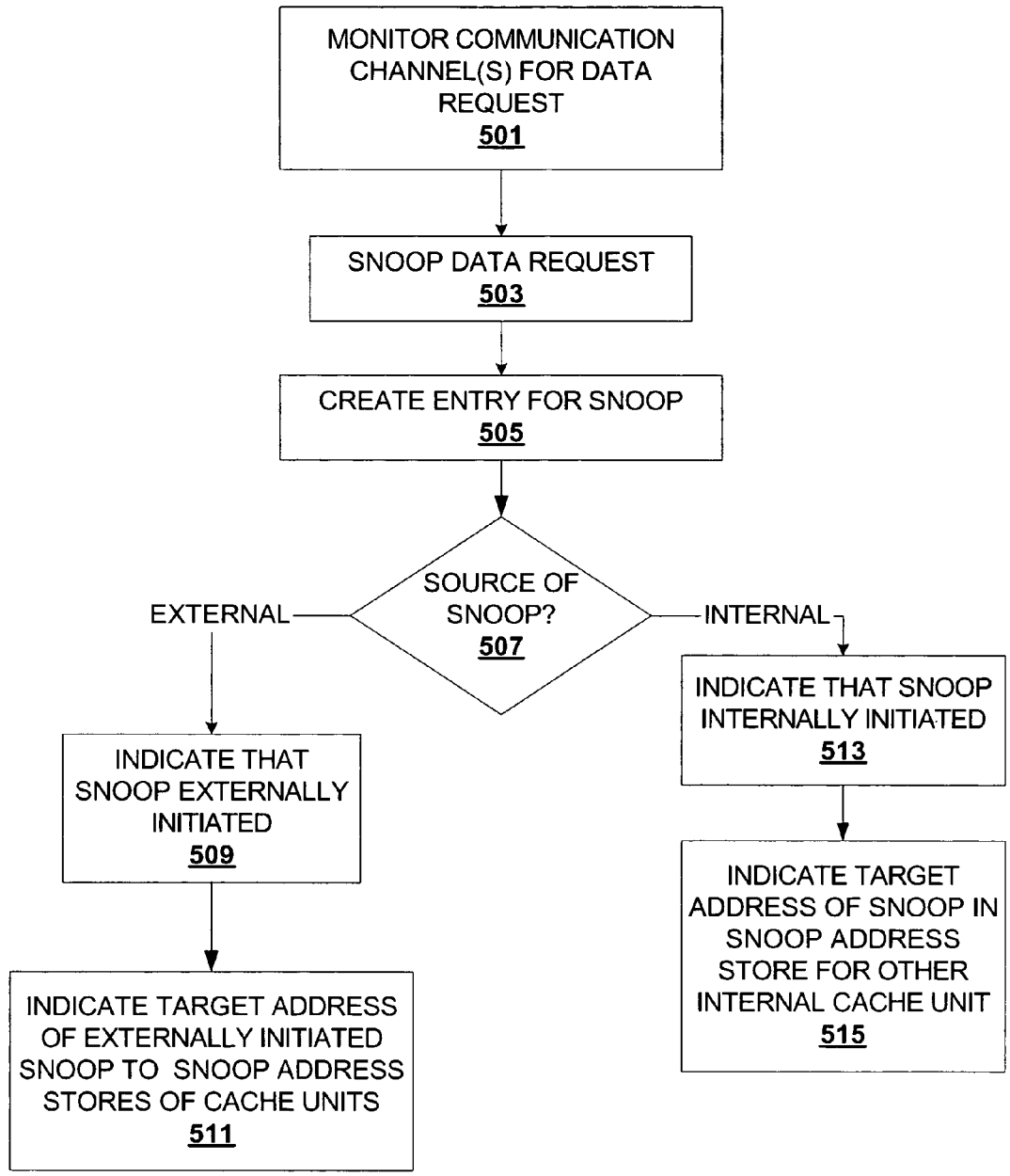
FIG. 5 depicts an exemplary flowchart for tracking detections of data requests.

FIG. 5 depicts an exemplary flowchart for tracking detections of data requests. At block 501, a communications channel(s) is monitored for data requests. For example, the cache coherency unit 201 of FIG. 2 monitors internal and external communication channels for read misses. At block 503, a data request is snooped. At block 505, an entry is created for a snoop. At block 507, the source of the snoop is determined. If the snoop was externally initiated, then control flows to block 509. If the snoop was internally initiated, then control flows to block 513.

At block 509, it is indicated that the snoop was externally initiated. At block 511, the address of the externally initiated snoop is indicated in snoop address stores of cache units. For example, the cache coherency unit 201 of FIG. 2 includes snoop address stores for the cache units 203 and 205. The cache coherency unit of 201 indicates the snoop address in each of the snoop address stores.

At block 513, it is indicated that the snoop was internally initiated. At block 515, the snoop address of the snoop is indicated in the snoop address store of a peer cache unit. For example, the cache coherency unit 201 snoops a read miss from the cache unit 205. The cache coherency unit 201 indicates the snoop address in a snoop address store for the cache unit 203. A more detailed illustration of tracking snoops within a structural context is provided in FIGS. 8-9.

Figure 6:
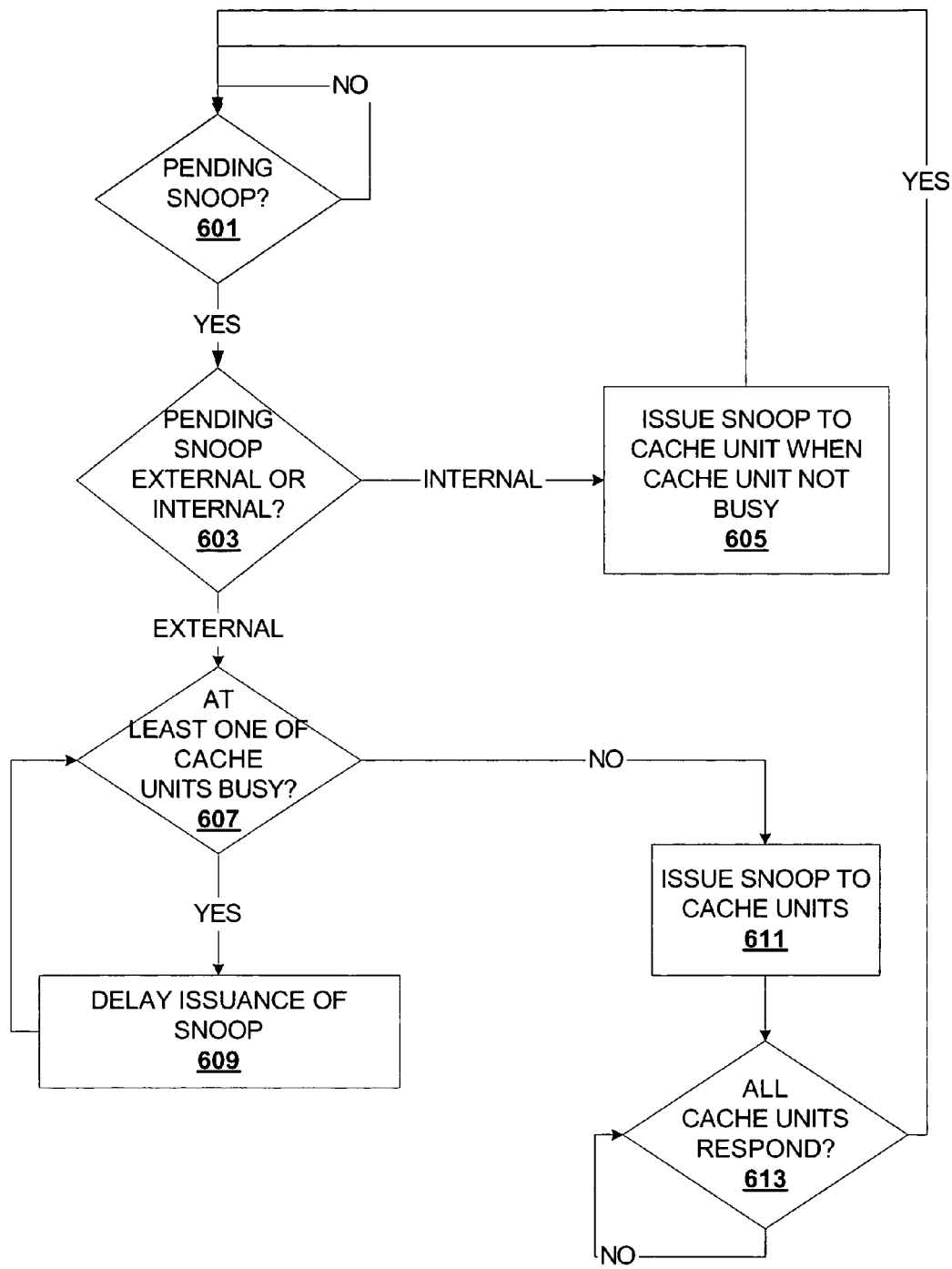
FIG. 6 depicts an exemplary flowchart for issuing snoops to cache units.

FIG. 6 depicts an exemplary flowchart for issuing snoops to cache units. At block 601, it is determined if there is a pending snoop for a cache unit. If there is a pending snoop, then control flows to block 603. If there is not a pending snoop, then control flows back to block 601.

At block 603, it is determined if the pending snoop was externally initiated or internally initiated. If the pending snoop was externally initiated, then control flows to block 607. If the pending snoop was internally initiated, then control flows to block 605.

At block 605, the snoop is issued to the cache unit when the cache unit is not busy. For example, if the cache unit is currently busy processing a previously issued snoop and cannot process another snoop, then the pending internally initiated snoop does not issue to the cache unit until the cache unit completes processing of the preceding snoop. Control flows from block 605 back to block 601.

At block 607, it is determined if at least one of the cache units are busy. If at least one of the cache units is busy, then control flows to block 609. If none of the cache units are busy, then control flows to block 611.

At block 609, issuance of the pending snoop is delayed. Control flows from block 609 back to block 607. For example, if the pending snoop is to be issued to three cache units, but one cache unit is busy processing a prior snoop, then the snoop is not issued to any of the cache units until the busy cache unit completes processing of the prior snoop.

At block 611, the snoop is issued to the cache units. Referring to the example described with respect to block 609, after the busy cache unit becomes capable of processing a snoop (i.e., completes processing of the prior snoop), then the snoop is issued to the cache units. At block 613, it is determined if all queried cache units have responded. If all queried cache units have not responded, then control flows back to block 613. If all queried cache units have responded, then control flows to block 601.

Figure 7:
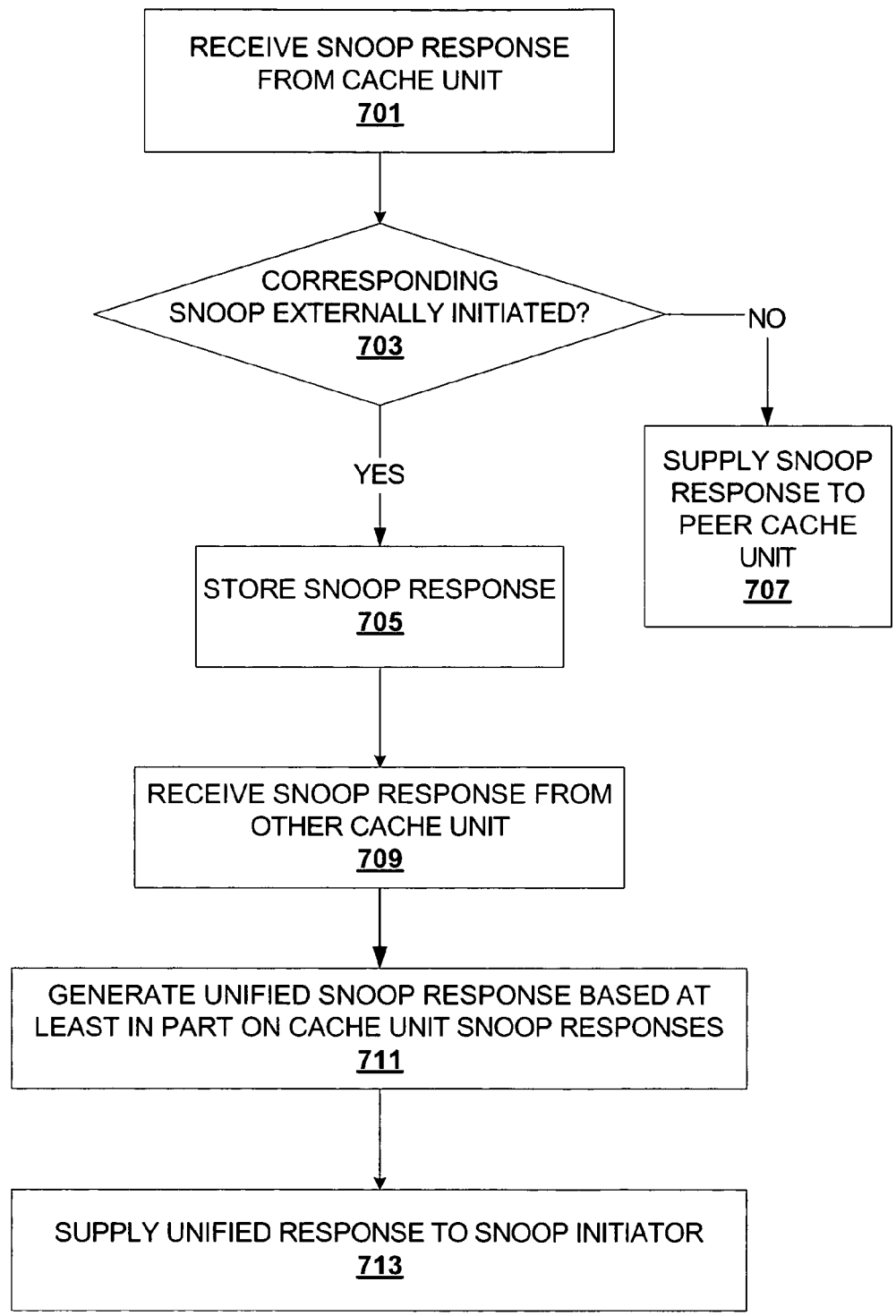
FIG. 7 depicts an exemplary flowchart for handling snoop responses.

FIG. 7 depicts an exemplary flowchart for handling snoop responses. At block 701, a snoop response from a cache unit is received. At block 703, it is determined if the corresponding snoop was externally initiated. If the corresponding snoop was externally initiated, then control flows to block 705. If the corresponding snoop was internally initiated, then control flows to block 707.

At block 707, the snoop response is supplied to a peer cache unit. For example, if a domain includes two cache units and a cache coherency unit of the domain receives from one of the cache units a snoop response, which corresponds to a snoop initiated by the other cache unit, then the cache coherency unit supplies the snoop response to the snoop initiating cache unit.

At block 705, the snoop response is stored. At block 709, a snoop response is received from the other cache unit. At block 711, a unified snoop response, which is based at least in part on both snoop responses, is generated. The unified snoop response merges the cache states indicated by the snoop responses and provides the data of the controlling snoop response. For example, MOESI complicit cache states may be merged in accordance with table 1 below.

| Cache Unit 1 Snoop Response | Cache Unit 2 Snoop Response | Unified Snoop Response |
| --- | --- | --- |
| Miss | Miss | Miss |
| RDS hit to E/S | Miss/Hit to S | Shared |
| Miss/Hit to S | RDS hit to E/S | Shared |
| Shared (RDS hit to S) | Shared (RDS hit to S) | Shared |
| Miss | Dirty | Dirty |
| Dirty | Miss | Dirty |

If a first cache unit provides a snoop response of dirty and a second cache unit provides a snoop response of miss, then the unified snoop response will indicate dirty and provide the data from the dirty cache line. If either cache unit indicates clean (an exclusive state, a shared state, etc.), then the unified snoop response will indicate clean and provide the data from the clean cache line. At block 713, the unified snoop response is supplied to the snoop initiator. For example, the unified snoop response is broadcast over a system bus for consumption of at least the corresponding snoop initiator.

While the flow diagram shows a particular order of operations performed by certain realizations of the invention, it should be understood that such order is exemplary (e.g., alternative realizations may perform the operations in a different order, combine certain operations, overlap certain operations, perform certain operations in parallel, etc.). For example, blocks 509 and 513 of FIG. 5 may be performed in parallel for different snoops; block 601 may await a trigger event instead of continuously monitoring for a pending snoop or monitor for pending snoops after a certain number of cycles; etc. Moreover, the functionality of the flowchart may change to accommodate variations in architecture that implement a greater number of cache units per cache coherency unit; cooperative cache coherency units; etc. In addition, the flow diagrams are separated to aid in understanding the described invention and not meant to be limiting upon the invention. The functionality of the flow diagrams may be performed by a single logic unit, multiple logic units, emulation software, etc.

Figure 8A:
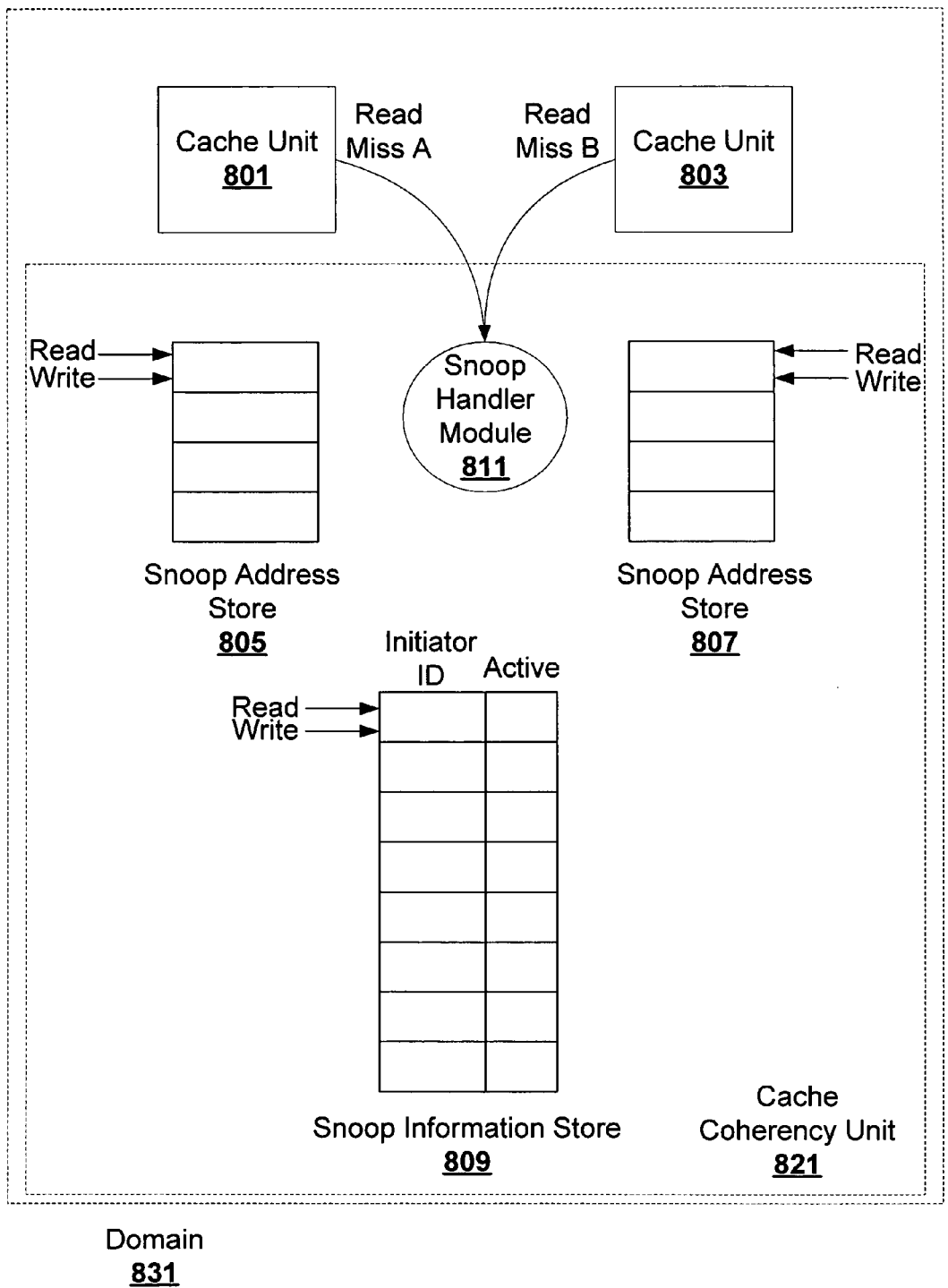
FIGS. 8A-8C illustrate an exemplary cache coherency unit handling snoops for multiple cache units.
Figure 8B:
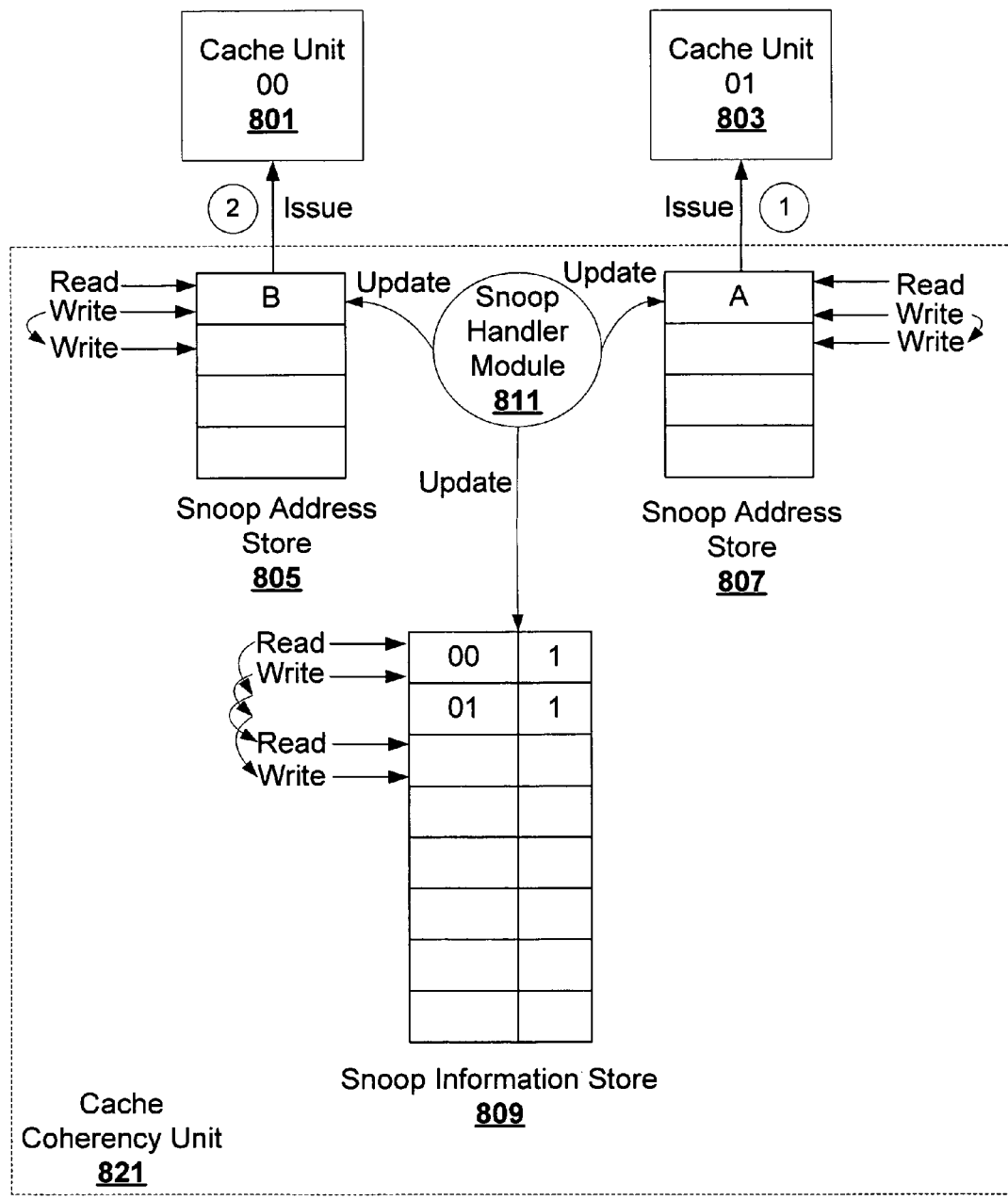
Figure 8C:
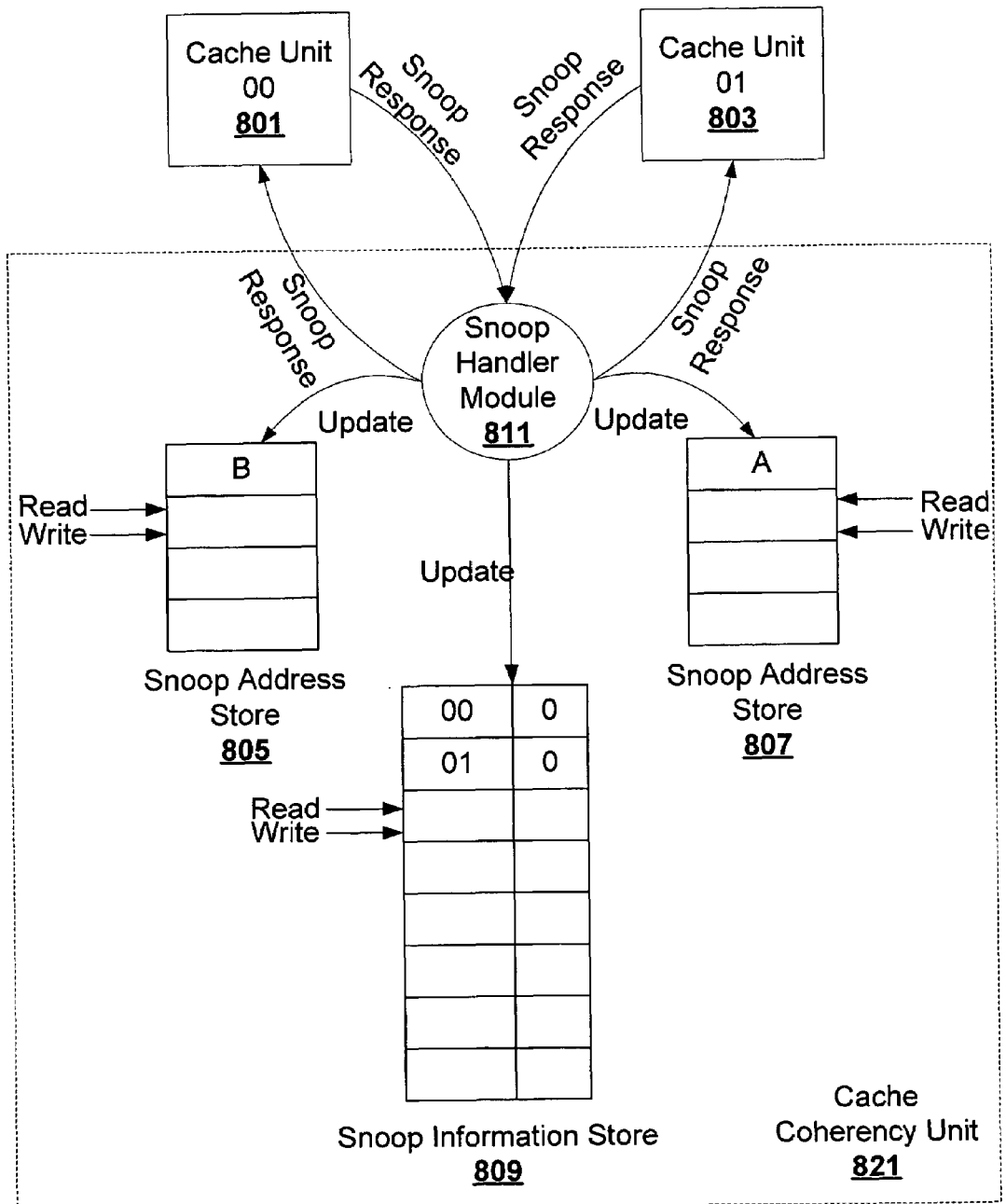

FIGS. 8A-8C illustrate an exemplary cache coherency unit handling snoops for multiple cache units. FIG. 8A illustrates an exemplary cache coherency unit handling multiple internal read misses. A domain 831 includes cache units 801 and 803, and a cache coherency unit 821 (e.g., the cache units 801 and 803 and the cache coherency unit 821 are within a single processing unit, utilize the same port for system communications, etc.). The cache coherency unit 821 includes a snoop information store 809, snoop address stores 805 and 807, and a snoop handler module 811. The snoop handler module 811 receives a read miss on a data location A from the cache unit 801, and a read miss on a data location B from the cache unit 803. Various realizations of the described invention implement the snoop handler module 811 differently (e.g., emulation software, hardware, firmware, etc.). Various realizations of the invention also implement the cache coherency unit 821 differently (e.g., as part of a bus controller, as a separate functional unit, etc.).

In FIG. 8A, a read and write pointer reference a first entry of the snoop address store 805. The snoop address store 807 also has a read and a write pointer referencing its first entry. The snoop address stores may be encoded in hardware tables, first-in-first-out queues, etc. Read and write pointers also reference a first entry of the snoop information store 809. The snoop information store 809 includes a first field for snoop initiator identifier and a second field for active snoop state. The snoop initiator identifier indicates the source of a snoop. The active snoop state indicates state of a snoop (e.g., whether a response has been received, whether the snoop is being processed, whether the snoop has been issued, etc.). In the exemplary implementation illustrated in FIGS. 8A-8C, the active field indicates whether a response has been received for the snoop.

FIG. 8B illustrates the exemplary cache coherency unit updating stores and issuing snoops. In FIG. 8B, the snoop handler module 811 updates the snoop information store 809 to reflect the read miss detected from the cache units 801 and 803. The identifiers of the cache units 801 and 803 are "00" and "01", respectively. The snoop handler module 811 updates the first entry of the snoop information store 809 to indicate "00" as the snoop initiator, and sets the active field to 1 to indicate active status of the snoop from the cache unit 801. The write pointer is updated to the second entry of the snoop information store 809. The snoop handler module 811 updates the snoop address store 807 to indicate the data location "A." The write pointer of the snoop address store 807 is updated to reference the second entry of the snoop address store 807. The snoop handler module 811 then updates the second entry of the snoop information store 809 to indicate "01" as the snoop initiator, and sets the active field to 1, to indicate active status of the snoop from the cache unit 803. It is assumed that the read miss from the cache unit 801 was detected by the snoop handler module 811 prior to detection of the read miss from the cache unit 803. The snoop handler module 811 updates the first entry of the snoop address store 805 to indicate the data location "B." The write pointer of the snoop address store 805 is updated to reference the second entry of the snoop address store 805. Updating of read and write pointers may be performed by the snoop handler module 811, may be performed by logic of the separate stores, etc.

The snoop handler module 811 reads the entry referenced by the read pointer of the snoop information store 809. Since the first entry is an internally initiated snoop and the cache unit 803 is not busy, then the snoop handler module issues the snoop for data location A to the cache unit 803. The read pointer is updated to reference the second entry of the snoop information store 809. The snoop handler module 811 reads the second entry of the snoop information store 811 and determines that the second entry of the snoop information store 809 also indicates an internally initiated snoop. If the cache unit 801 is not busy, then the snoop handler module 811 issues the snoop for data location B to the cache unit 801. The read pointer of the snoop information store 809 is updated to reference the third entry of the snoop information store 809. Since the pending snoop at the front of the snoop information store 809 (i.e., the snoop referenced by the read pointer) are internally initiated, then the snoop handler module 811 issues the snoops to the cache units 801 and 803 without delay.

FIG. 8C illustrates the exemplary cache coherency unit handling snoop responses. The cache units 801 and 803 generate snoop responses to the snoop handler module 811. In response to the snoop response from the cache unit 803, the snoop handler 811 supplies the snoop response to the cache unit 801, and sets the active field of the corresponding snoop entry to indicate inactive. In response to the snoop response from the cache unit 801, the snoop handler module 811 supplies the snoop response to the cache unit 803, and sets the active field of the corresponding snoop entry to indicate inactive. Various techniques can be implemented for the snoop handler module 811 to access the snoop information store to modify the active field. For example, an additional field can be maintained in the snoop address stores. The additional field references the corresponding entry in the snoop information store. In another example, a response pointer is maintained and entries are searched from the response pointer to locate the corresponding entry to be modified to indicate inactive. With regard to responses to internally initiated snoops, the snoop handler module 811 may modify the snoop responses; forward the snoop responses; etc.

Figure 9A:
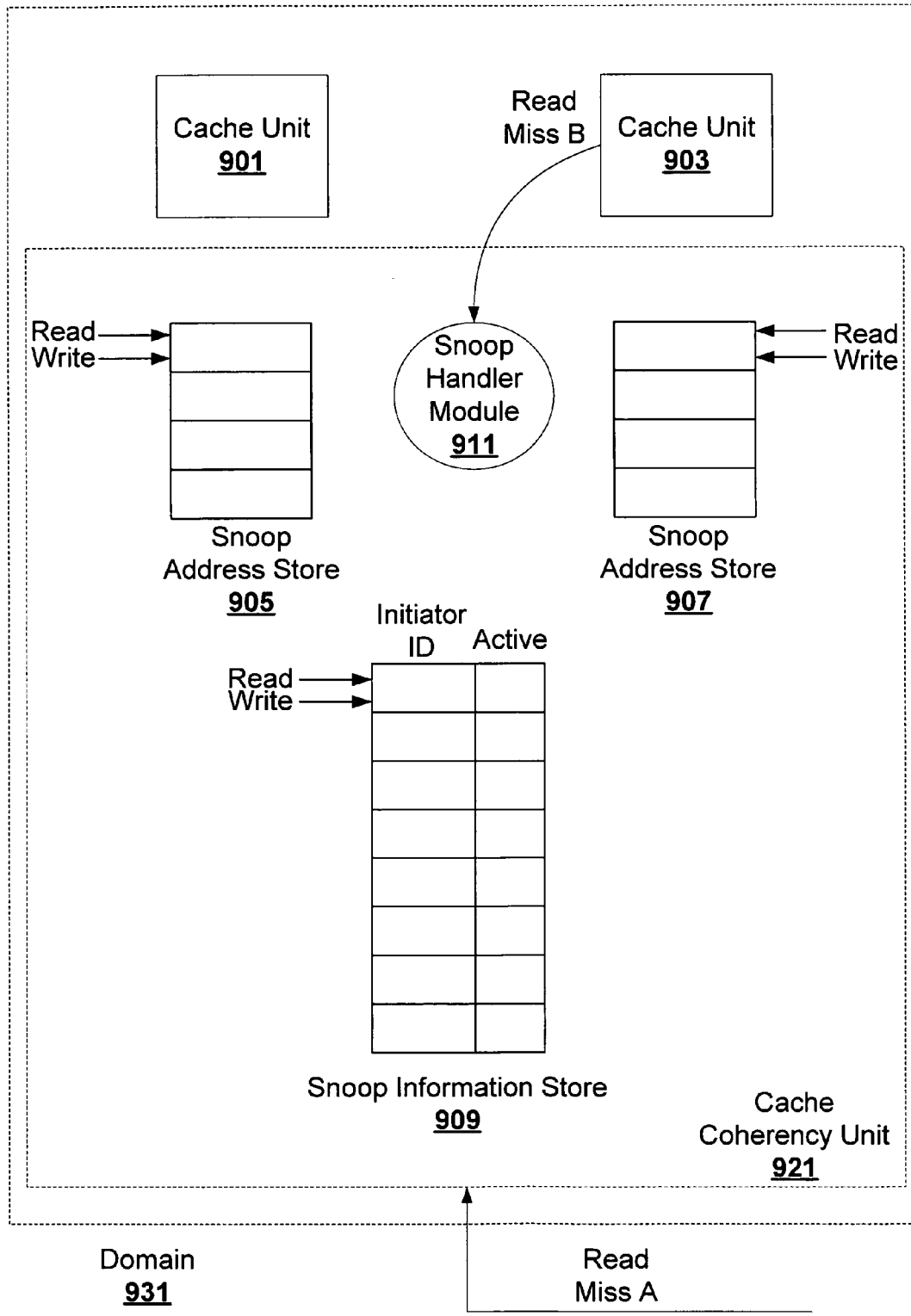
FIGS. 9A-9E illustrate exemplary handling of an externally initiated snoop and an internally initiated snoop.

FIGS. 9A-9E illustrate exemplary handling of an externally initiated snoop and an internally initiated snoop. FIG. 9A illustrates an exemplary cache coherency unit detecting an internally initiated data request and an externally initiated data request. In FIG. 9A, a domain 931 includes cache units 901 and 903, and a cache coherency unit 921. The cache coherency unit 921 is similar to the cache coherency unit 821 of FIG. 8. The cache coherency unit 921 includes a snoop handler module 909, snoop address stores 905 and 907, and a snoop information store 909. The cache coherency unit 921 detects a read miss for a data location B from the cache unit 903. The cache coherency unit 921 also detects a read miss for a data location A from a source external to the domain 931. Assume for the illustration of FIGS. 9A-9E that the external read miss was detected prior to detection of the internal read miss.

Figure 9B:
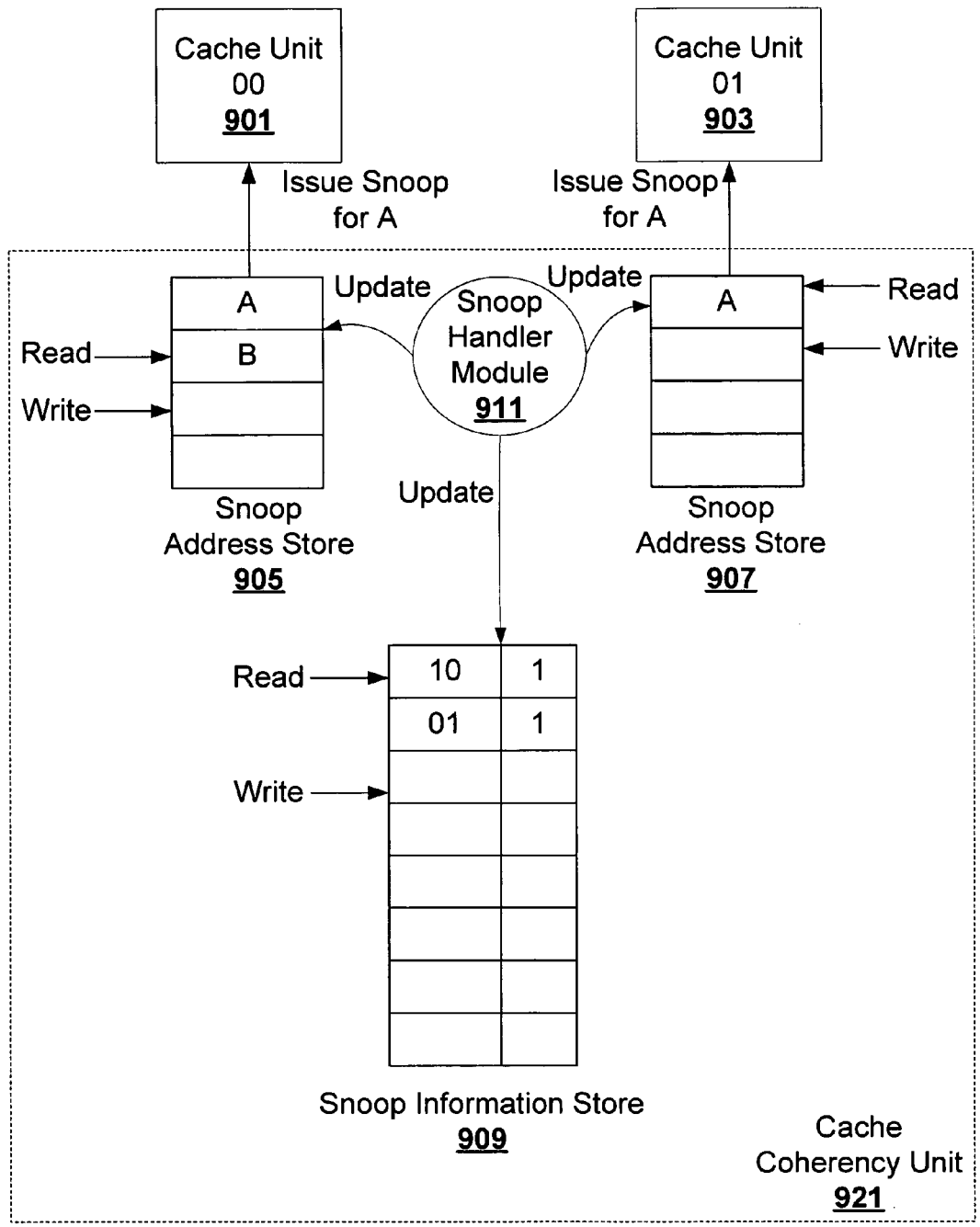

FIG. 9B illustrates the exemplary cache coherency unit handling snoops. Assuming the externally initiated read miss is detected by the cache coherency unit 921 first, then the snoop handler module 911 updates the snoop information store 909 to reflect the read miss to data location A. Assuming the initiator of the read miss to data location A is identified to the system as "10," then the snoop handler module 911 indicates the source identity in the snoop information store 909 and sets the active bit to 1. The write pointer of the snoop information store 909 is updated to the next entry. The snoop handler 911 updates the snoop address stores 905 and 907 to indicate the data location A. The write pointers of the snoop address stores 905 and 907 are incremented. The snoop handler module 911 accesses the second entry of the snoop information store 909 and updates the entry to reflect the read miss from the cache unit 903. The snoop handler module 911 indicates the identity of the cache unit 903 and sets the active field to indicate active in the second entry of the snoop information store 909. The write pointer of the snoop information store 909 is incremented. The snoop handler module 911 writes to the snoop address store 905 in accordance with the current write pointer, to indicate the data location B. The write pointer of the snoop address store 905 is incremented.

The snoop handler module 911 reads the snoop information store 909 in accordance with the read pointer, which references the entry that corresponds to the read miss from an external source. The snoop handler module 911 determines that the snoop is externally initiated, and, if the cache units 901 and 903 are not busy, issues the snoop for data location A to the cache units 901 and 903. If either of the cache units 901 and 903 is busy, then the snoop handler module 911 stalls the snoop until both of the cache units are capable of processing the snoop. The read pointers for the snoop address stores 905 and 907 are incremented. Since the issued snoop is externally initiated, then snoop handler module 911 does not read the next entry of the snoop information store. For example, the read pointer is not incremented, the read pointer is incremented but the snoop handler module 911 waits for responses to the externally initiated snoop, etc. Various techniques can be implemented to distinguish snoops that are internally initiated from snoops that are externally initiated. For example, identifiers of snoop initiators may be modified so that internally initiated snoop source identifiers are preceded with a 0 and externally initiated snoop source identifiers are preceded with a 1; an additional field may be maintained in the snoop information store 909 that is set by a unit that detects data requests, such as the snoop handler module 911, to indicate whether the corresponding entry was internally initiated or externally initiated; the snoop handler module 911 may compare the initiator identifier against known identifiers of possible initiators within the domain of the snoop handler module 911; etc.

Figure 9C:
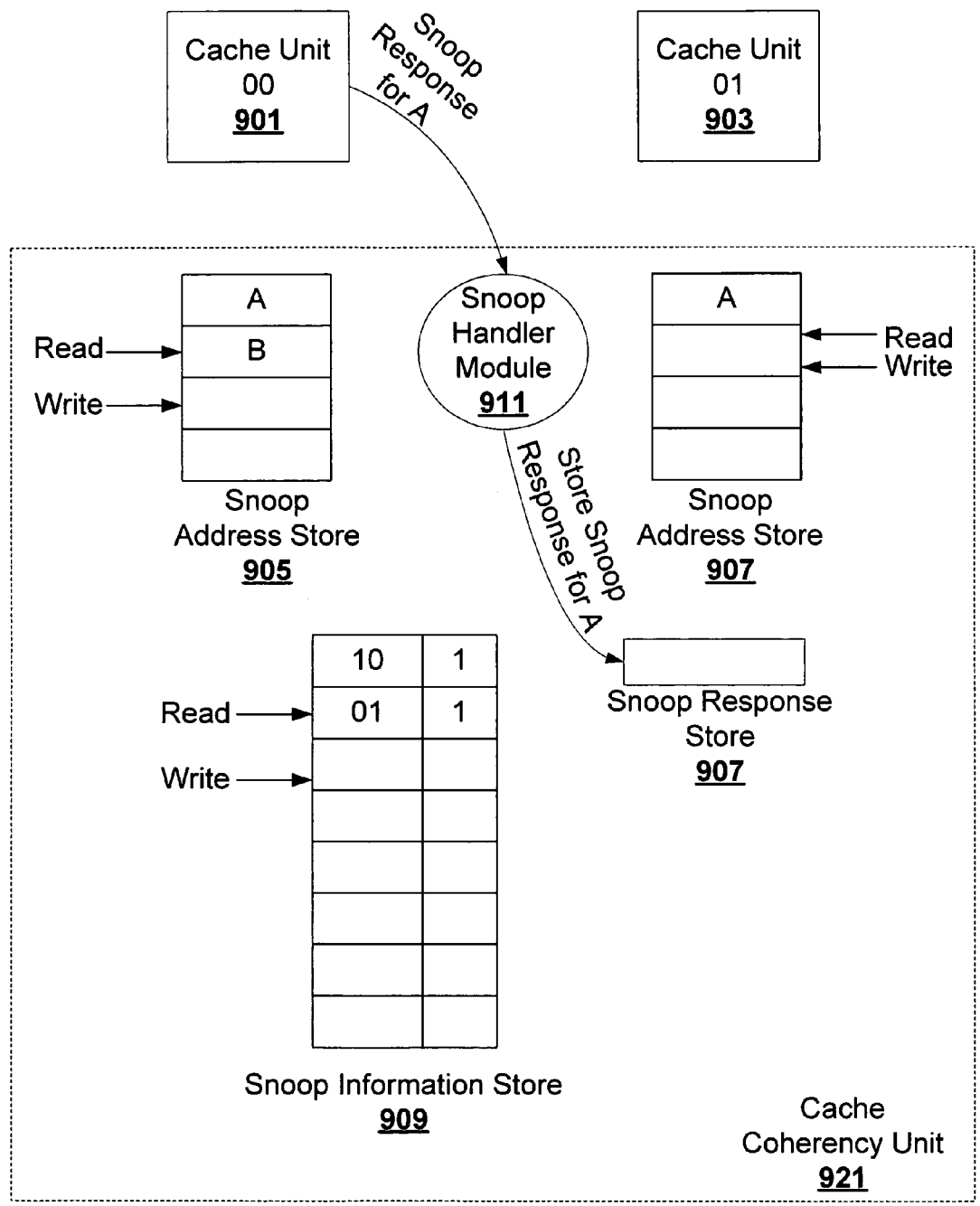

FIG. 9C illustrates the exemplary cache coherency unit handling a response to the externally initiated snoop. The cache unit 901 provides a snoop response for data location A to the snoop handler module 911. Since the cache unit 903 still has not responded, then the snoop handler module 911 stores the response from the cache unit 901 into a snoop response store 907. The internally initiated snoop still is not issued to the cache unit 901. Although the cache unit 901 is capable of processing the internally initiated snoop, the snoop for location B is not issued. Blocking a snoop that follows a prior externally initiated snoop prevents snoop responses from being supplied inconsistent with snoop order. For the system to maintain cache coherency, the snoop responses should correspond to snoop order.

Figure 9D:
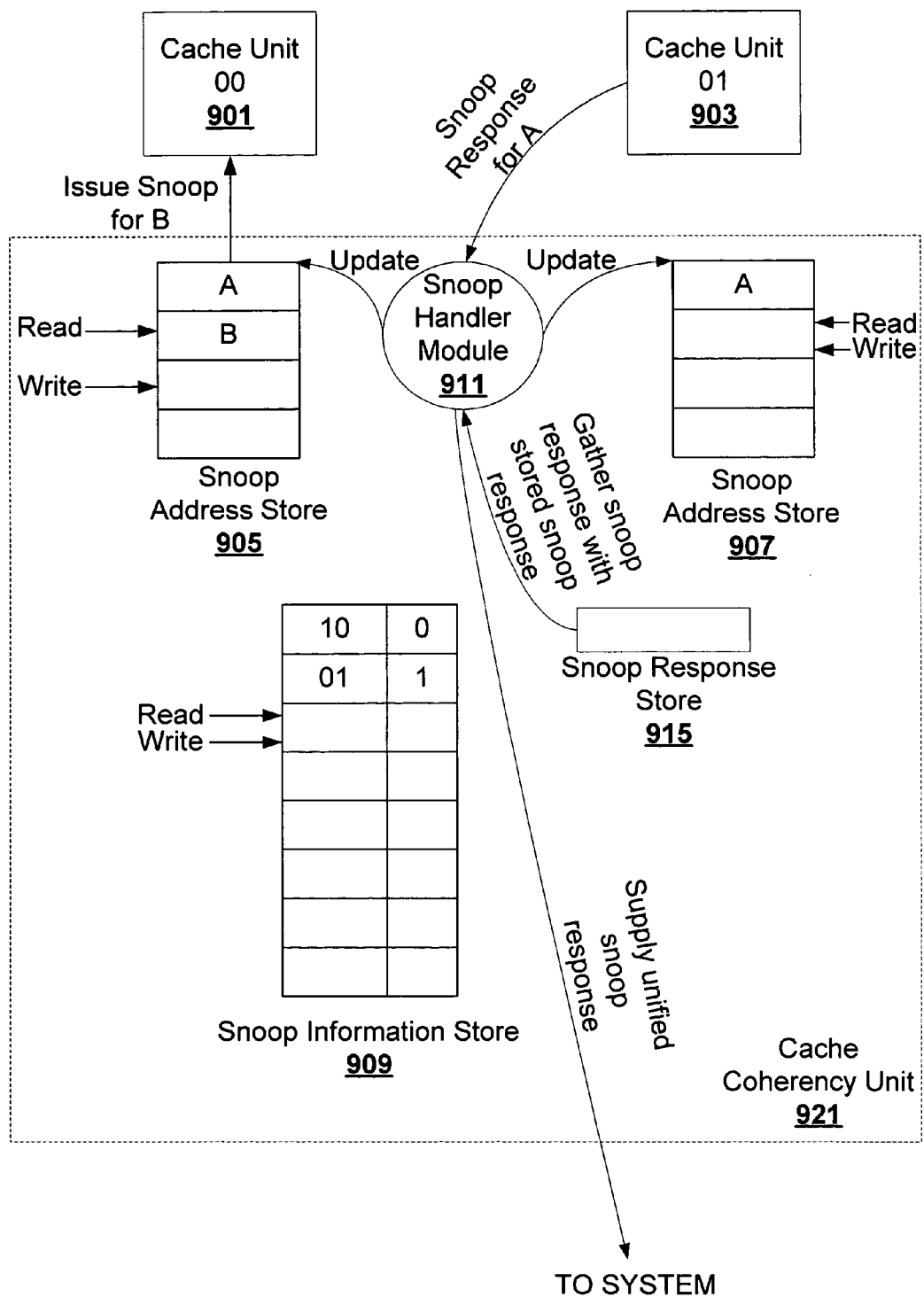

FIG. 9D illustrates the exemplary cache coherency unit merging snoop responses. The cache unit 903 provides a snoop response for data location A to the snoop handler module 911. The snoop handler module 911 gathers the snoop responses from the cache unit 903 and the snoop response store 915. A unified response is generated that indicates a cache state based on the cache states of the merged responses (e.g., in accordance with table 1). The snoop handler module 911 supplies the unified response to the system. The snoop handler module 911 issues the snoop for location B to the cache unit 901. The active field of the entry for the externally initiated snoop is updated to indicate inactive. The read pointer for the snoop information store 909 is incremented. The snoop handler module 911 reads from the snoop information store 909 and issues the snoop for location B to the cache unit 901. The read pointer for the snoop address store 905 is incremented. Since the issued snoop was internally initiated, the read pointer of the snoop information store 909 is incremented.

Figure 9E:
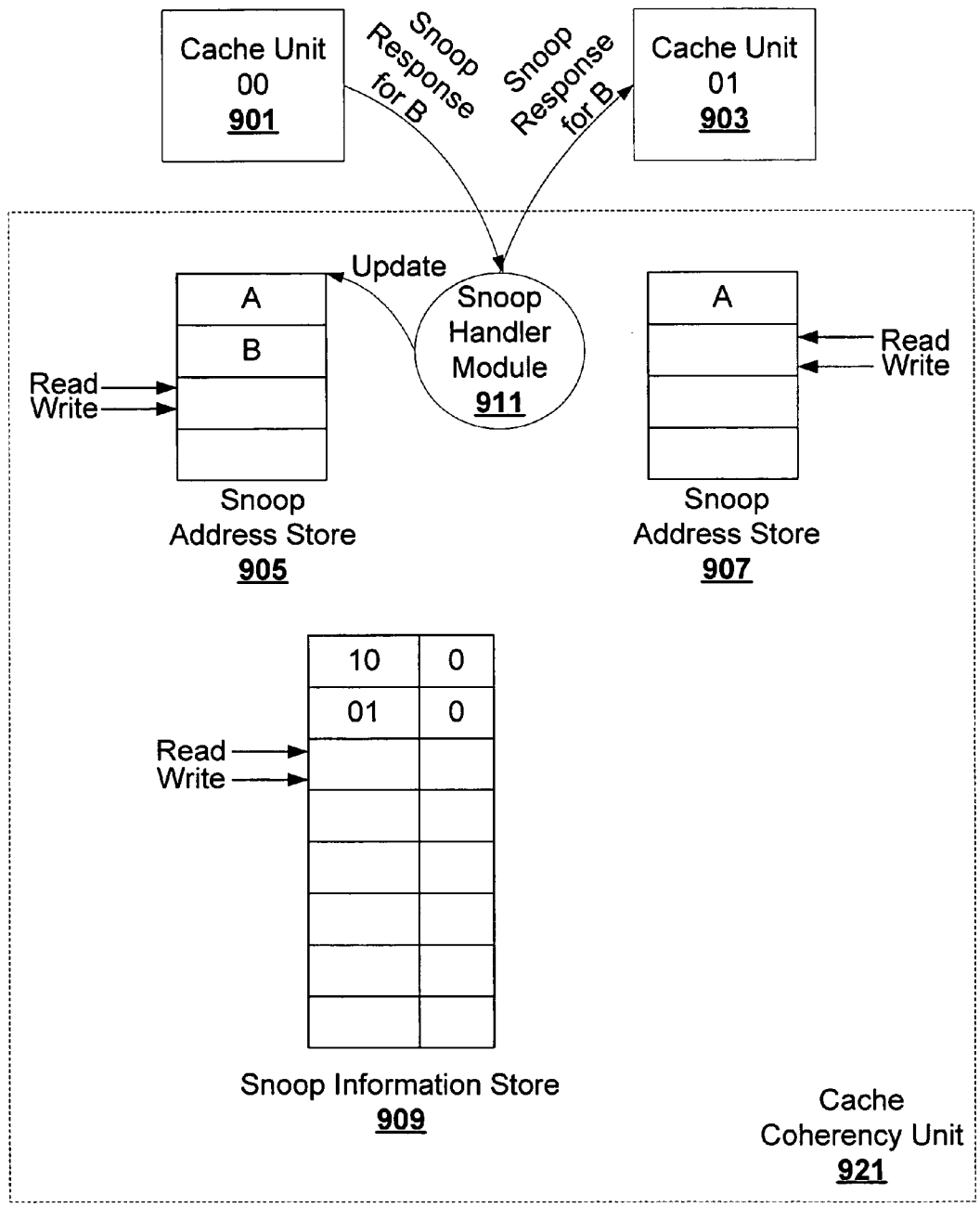

FIG. 9E illustrates the exemplary cache coherency unit supplying the response to the internally initiated snoop. The cache unit 901 provides a snoop response for data location B to the snoop handler module 911. The snoop handler module 911 supplies the snoop response for data location B, or a variation of the snoop response, to the cache unit 903. The activity field of the corresponding entry in the snoop information store 909 is set to indicate inactive.

Figure 10:
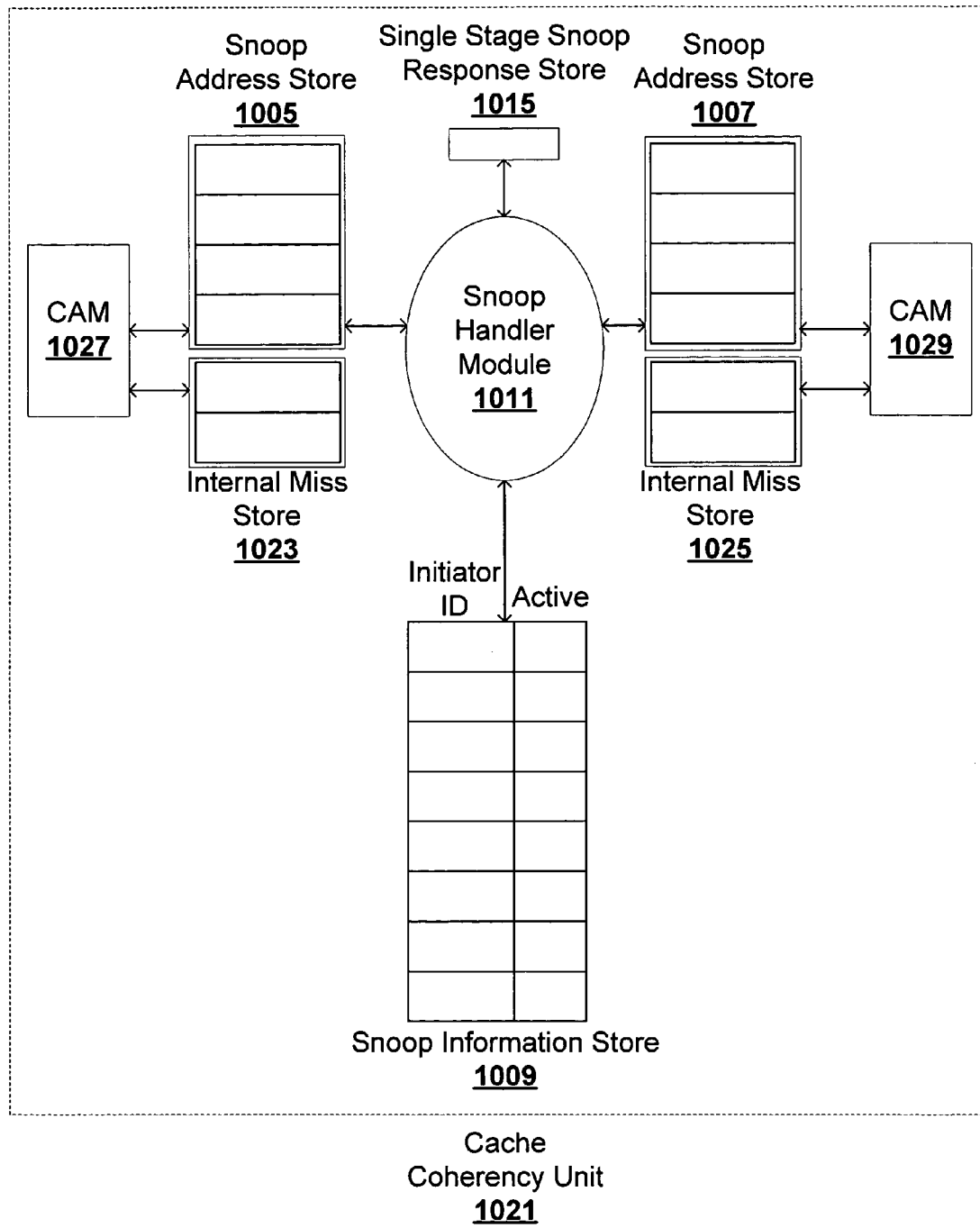
FIG. 10 depicts an exemplary cache coherency unit with internal miss stores.

FIG. 10 depicts an exemplary cache coherency unit with internal miss stores. A cache coherency unit 1021 includes a snoop information store 1009, a snoop handler module 1011, snoop address stores 1005 and 1007, a single stage snoop response store 1015, internal miss stores 1023 and 1025, and content addressable memories (CAMs) 1027 and 1029. Although the snoop address stores are illustrated with a single field, various realizations of the described invention may implement additional fields (e.g., indication of snoop initiator, reference field to the corresponding entry in the snoop information store, an indication of the corresponding entry in the snoop information store, blocking fields, etc.). The cache coherency unit 1021 functions similarly to those previously illustrated. The internal miss stores 1023 and 1025 are utilized by the cache coherency unit 1021 to correlate snoops and internally generated misses. For example, assume a cache unit is associated with the internal miss store 1025. The cache unit generates a read miss for A. The data location A is recorded in the internal miss store 1025. If a snoop for A arrives and is written into the snoop address store 1007, which is also associated with the cache unit, then the snoop will be blocked from issuing. When the addresses of the snoop address store 1007 are compared against the addresses of the internal miss store 1025 with the CAM 1029, matching entries will be blocked from issuing. When data arrives from memory location A in response to the read miss, the corresponding entry in the internal miss store 1025 is removed.

It should be understood that the exemplary cache coherency unit depicted in the Figures are provided to aid in understanding the described invention and not meant to be limiting upon the invention. The cache coherency unit can adapt to variations in architecture and structure. For example, a snoop address store may host addresses for multiple cache units and be maintained with multiple read and write pointers. The structures can be implemented with a variety of techniques (e.g., wrap-around queues, hash tables, etc.). In addition, the cache coherency unit may scale for additional cache units. For example, a cache coherency unit may have more than two cache units within the same domain. Additional structures may be added to the cache coherency unit to adapt to the additional cache units. A response to an internally initiated snoop may be stored and merged with other internal snoop responses. A larger structure to host snoop responses (e.g., n−1 entry snoop response store for domain with n cache units), whether internal or external, may be implemented with additional information to indicate which cache units have responded and which cache units have not responded. Furthermore, various mechanisms for comparing snoop addresses may be utilized to compare addresses in addition to/instead of a content addressable memory.

The described invention may be provided as a computer program product, or software, that may include a machine-readable medium having stored thereon instructions, which may be used to program a computer system (or other electronic devices) to perform a process according to the present invention. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, optical, acoustical or other form of propagated signal (e.g., carrier waves, infrared signals, digital signals, etc.); or other types of medium suitable for storing electronic instructions.

Exemplary computer systems host the processing units illustrated in FIGS. 1-4. Such exemplary computer systems also include system memory (e.g., SRAM DRAM, RDRAM, EDO RAM, DDR RAM, EEPROM, etc.), a system bus (e.g., LDT, PCI, ISA, etc.), a network interface (e.g., an ATM interface, an Ethernet interface, a Frame Relay interface, etc.), and a storage device(s) (e.g., optical storage, magnetic storage, etc.). Exemplary computer systems may include fewer or additional components (e.g., video cards, audio cards, additional network interfaces, peripheral devices, etc.).

While circuits and physical structures are generally presumed, it is well recognized that in modern semiconductor and design fabrication, physical structures and circuits may be embodied in computer readable descriptive form suitable for use in subsequent design, test, or fabrication stages as well as in resultant fabricated semiconductor integrated circuits. Accordingly, claims directed to traditional circuits or structure may, consistent with particular language thereof, read upon computer readable encodings and representations of same, whether embodied in media or combined with suitable reader facilities to allow fabrication, test, or design refinement of the corresponding circuits and/or structures.

While the invention has been described with reference to various realizations, it will be understood that these realizations are illustrative and that the scope of the invention is not limited to them. Many variations, modifications, additions, and improvements are possible. More generally, realizations in accordance with the present invention have been described in the context of particular realizations. These realizations are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A method of operating a multi-cache processing unit in a system with multiple processing units, the method comprising:

issuing to multiple cache units of the processing unit, snoops initiated externally with respect to the processing unit;

storing snoop addresses in respective queues of the cache units;

delaying issuance of the snoop addresses that correspond to an externally initiated snoop at least until the cache units have completed prior pending snoop processing; and supplying a unified response to the system from the processing unit, wherein the unified response is based at least in part on combination of cache responses to externally initiated snoops, wherein the unified response indicates miss if cache responses indicate miss, clean if at least one of the cache responses indicate clean, shared if at least one of the cache responses indicate shared, or dirty if at least one of the cache responses indicate dirty.

2. The method of claim 1, further comprising indicating initiators of externally initiated snoops in a common store for the cache.

3. The method of claim 1, wherein the unified response indicates a cache state for the processing unit that is based at least in part on states of the multiple cache.

4. The method of claim 3, wherein snoop responses are in accordance with
a cache coherency protocol that includes one or more of a MOESI cache coherency protocol, a MESI cache coherency protocol, a MOSI cache coherency protocol, and a MSI cache coherency protocol.

5. The method of claim 1 further comprising supplying an internal snoop response to the initiating cache unit.

6. The method of claim 1 further comprising generating a unified internal snoop response based at least in part on cache responses to an internally initiated snoop and supplying the unified internal snoop response to the initiating cache unit.

7. A computer program product encoding instructions in one or more machine-readable media that cause a machine to perform the operations of claim 1.

8. A method comprising:
determining if a snoop is externally initiated or internally initiated with respect to a domain;
if the snoop is internally initiated,
issuing the snoop from the internal first cache unit that initiates the snoop to an internal second cache unit, wherein the first and second cache units are of the domain,
supplying an internal snoop response from the second cache unit to the first cache unit; and
if the snoop is externally initiated,
issuing the externally initiated snoop to the first and second cache units,
generating a processing unit response based at least in part on responses from the first and second cache units,
indicating the source of the snoop in a first encoding;
indicating the snoop address in snoop queue for the first cache unit and in a snoop queue for the second cache unit;
storing the first supplied cache response from the cache units at least until the second cache response is supplied; and
supplying the processing unit response at least to the source of the externally initiated snoop.

9. The method of claim 8, wherein snoop responses are in accordance with a cache coherency protocol that includes one or more of a MOESI cache coherency protocol, a MESI cache coherency protocol, a MOST cache coherency protocol, and a MSI cache coherency protocol.

10. The method of claim 9, wherein the generated processing unit response indicates miss if both cache responses indicate miss, shared if at least one of the cache responses indicate shared, clean if at least one of the cache responses indicate clean, or dirty if at least one of the cache responses indicate dirty.

11. The method of claim 8 further comprising delaying issuance of the externally initiated snoop at least until the first and second cache units have completed processing of one or more prior pending snoops.

12. The method of claim 8 further comprising:
issuing the internally initiated snoop to a third internal cache unit;
supplying the internal response to the first internal cache unit, wherein the internal response is based at least in part on the second cache unit's response and the third cache unit's response.

13. The method of claim 8 further comprising delaying issuance of the snoop if the snoop address overlaps an address of an internal cache miss of a read or write operation at least until arrival of data for the internal cache miss.

14. The method of claim 8, wherein the domain corresponds to one or more of a processing unit of a multi-processing unit system and a port.

15. The method of claim 14 wherein the port includes a JBus port.

16. The method of claim 8 embodied as a computer program product encoded in one or more machine-readable media.

17. An integrated circuit comprising:
a plurality of cache units, each of the plurality of cache units having at least one cache;
a snoop controller for the integrated circuit, the snoop controller coupled with the plurality of cache units and the snoop controller having, a snoop information store having a plurality of entries, each of the entries to indicate source of a snoop and whether a snoop is being processed;
snoop address stores to indicate addresses of corresponding snoops indicated in the snoop information store, wherein the snoop address stores indicate addresses for respective ones of the plurality of cache units; and
a snoop control logic coupled with the snoop information store and the snoop address stores, the snoop control logic to issue an externally initiated snoop to the plurality of cache units and to combine cache unit snoop responses to an externally initiated snoop.

18. The integrated circuit of claim 17, wherein indication of snoop source includes one or more of source identifier and whether a snoop is internally initiated or externally initiated.

19. The integrated circuit of claim 17, wherein the snoop address stores and the snoop information store include first-in-first-out queues.

20. The integrated circuit of claim 19, wherein the snoop control logic maintains read and write pointers for the snoop information store and the snoop address stores.

21. The integrated circuit of claim 17 further comprising an internal cache miss store to record internal cache misses of read and write operations, wherein the snoop control logic prevents issuance of snoops with target addresses that overlap addresses indicated in the local miss store, at least until indication that data of the cache misses has arrived.

22. The integrated circuit of claim 21, wherein the local miss store includes one or more of summing content addressable memory and content addressable memory.

23. The integrated circuit of claim 17 further comprising a response store to host snoop responses at least until gathered.

24. The integrated circuit of claim 23 further comprising the snoop controller logic to gather a first cache unit snoop response from the response store with a second cache unit snoop response, and to generate a unified snoop response based at least in part on the first and second cache unit snoop responses.

25. The apparatus of claim 23, wherein the response store includes entries sufficient to store responses from at most less than all of the plurality of cache units.

26. The integrated circuit of claim 17, wherein the cache includes one or more of L1 cache, L2 cache, and L3 cache.

* * * * *

UNITED STATES PATENT AND TRADEMARK OFFICE
CERTIFICATE OF CORRECTION

| | | |
|---|---|---|
| PATENT NO. | : 7,263,586 B1 | Page 1 of 1 |
| APPLICATION NO. | : 10/779839 | |
| DATED | : August 28, 2007 | |
| INVENTOR(S) | : Kapil | |

It is certified that error appears in the above-identified patent and that said Letters Patent is hereby corrected as shown below:

On the Title page, in field (57), under "Abstract", in column 2, line 5, after "cache" delete "nits." and insert -- units. --, therefor.

Signed and Sealed this

Twenty-seventh Day of November, 2007

JON W. DUDAS
*Director of the United States Patent and Trademark Office*